United States Patent
Schuelke et al.

(10) Patent No.: US 8,000,073 B2
(45) Date of Patent: Aug. 16, 2011

(54) CURRENT-MODE UNDER VOLTAGE LOCKOUT CIRCUIT

(75) Inventors: Robert John Schuelke, Lakeville, MN (US); Gregory J. Rausch, Minnetonka, MN (US)

(73) Assignee: Polar Semiconductor, Inc., Bloomington, MN (US)

( * ) Notice: Subject to any disclaimer, the term of this patent is extended or adjusted under 35 U.S.C. 154(b) by 551 days.

(21) Appl. No.: 12/075,400

(22) Filed: Mar. 11, 2008

(65) Prior Publication Data

US 2009/0231770 A1    Sep. 17, 2009

(51) Int. Cl.
*H02H 3/24* (2006.01)

(52) U.S. Cl. .......................................................... 361/92
(58) Field of Classification Search ........................ 361/92
See application file for complete search history.

(56) References Cited

U.S. PATENT DOCUMENTS

| | | | |
|---|---|---|---|
| 4,887,022 A * | 12/1989 | Gontowski | 323/284 |
| 5,266,884 A * | 11/1993 | Agiman | 323/284 |
| 6,842,321 B2 | 1/2005 | Brohlin | |
| 6,989,708 B2 * | 1/2006 | Xi | |
| 7,084,640 B2 * | 8/2006 | Berhorst et al. | 324/611 |
| 7,382,167 B1 * | 6/2008 | Umminger et al. | 327/76 |
| 7,486,064 B2 * | 2/2009 | Sasaki et al. | 323/299 |
| 2004/0012904 A1 * | 1/2004 | Balakrishnan et al. | 361/92 |
| 2007/0268059 A1 * | 11/2007 | Sakaguchi et al. | 327/333 |
| 2009/0303641 A1 * | 12/2009 | Abe | 361/18 |

* cited by examiner

*Primary Examiner* — Jared J Fureman
*Assistant Examiner* — Scott Bauer
(74) *Attorney, Agent, or Firm* — Kinney & Lange, P.A.

(57) ABSTRACT

A current-mode under voltage lockout (UVLO) circuit provides an output signal that indicates to connected devices whether a connected power supply is sufficient (i.e., of sufficient strength and stability) based on a comparison of a current that is proportional to the power supply and a reference current. The current-based UVLO circuit employs a reference current generator that is capable of providing a stable reference current and a voltage-to-current converter that provides a current proportional to the power supply voltage. A comparator compares the reference current to the current proportional to the power supply voltage and determines based on the magnitudes of the two currents whether the power supply voltage is sufficient or 'good' and generates an output signal indicating the status of the power supply voltage.

16 Claims, 6 Drawing Sheets

CURRENT-MODE UNDER VOLTAGE LOCKOUT CIRCUIT

BACKGROUND

The present invention relates to under voltage lockout (UVLO) circuits and specifically to current-mode UVLO circuits.

Under voltage lockout circuits are commonly employed to monitor a power supply and to provide a signal representing the quality of the power supply. Initial application of power to an integrated circuit therefore begins with the UVLO circuit generating an output signal that initially indicates that the power supply is insufficient, such that power is prevented from being supplied to the remainder of the integrated circuit. The UVLO circuit monitors the power supply voltage and in response to the power supply voltage reaching a threshold value switches the signal representation from a 'supply bad' state to a 'supply good' state that indicates to the remainder of the integrated circuit that initialization processes may begin. The UVLO circuit continues to monitor the power supply and in response to the power supply falling below a threshold value provides an output signal that represents that the power supply is too low and thereby prevents power from being provided to a connected device or circuit. In this way, the anomalous behavior and current consumption of connected circuits caused by low-voltage conditions is prevented.

Typical UVLO circuits rely on comparisons of the power supply voltage to a threshold voltage to determine whether the signal is good or bad (i.e., of sufficient magnitude). However, the power supply may include a large range of voltages (e.g., 0-30 Volts) that requires the UVLO circuit to be capable of handling large voltages. Similarly, the UVLO circuit must be capable of generating a threshold voltage that is supply, temperature, and process independent and that can be used as a reference value to which the supply voltage is compared. In particular, band-gap voltage sources are often constructed to supply the stable and temperature independent voltage source used as a reference voltage. However, UVLO circuits capable of handling large voltage ranges increase the cost and space requirements for UVLO circuits.

SUMMARY

A current-mode under voltage lockout (UVLO) circuit provides an output signal that indicates to connected devices whether a connected power supply is sufficient (i.e., of acceptable magnitude and stability) based on a comparison of a reference current to a current proportional to the power supply. The current-mode UVLO circuit includes a voltage-to-current converter that generates the proportional current in response to a power supply voltage. In addition, a reference current generator is employed to generate a stable reference current value to which the current proportional to the power supply can be compared. The reference current and the current proportional to the power supply are provided to a comparator, which in response to the comparison generates an output signal that indicates the state of the power supply voltage.

DETAILED DESCRIPTION

Figure 1:
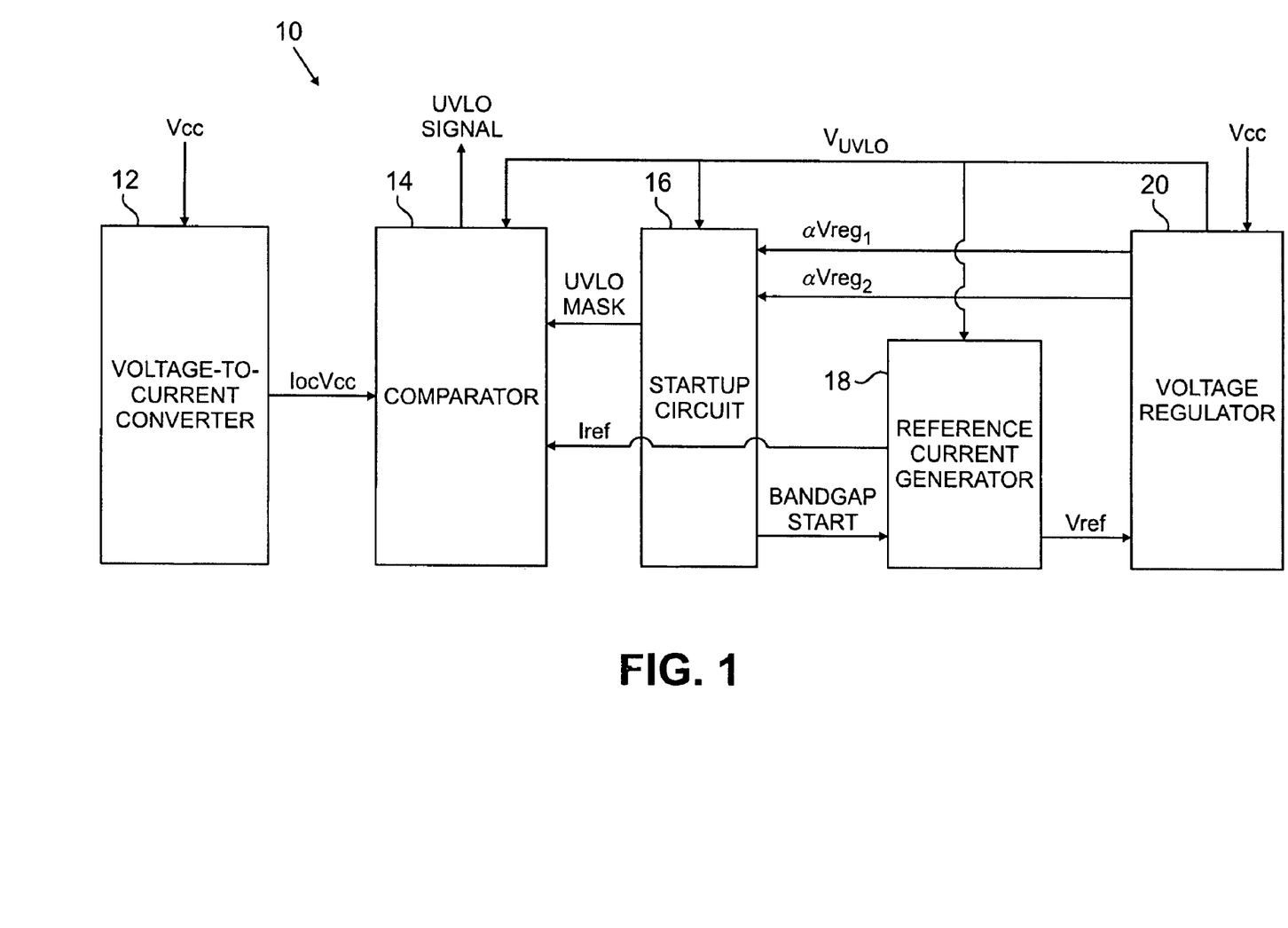
FIG. 1 is a block diagram of and under voltage lockout circuit according to an embodiment of the present invention.

FIG. 1 illustrates an embodiment of current-mode under voltage lockout (UVLO) circuit 10 that consumes very little power and is self-contained. In particular, UVLO circuit 10 receives power supply voltage $V_{cc}$ as an input and provides a UVLO signal as an output. The UVLO signal indicates whether the power supply signal is 'good' or 'bad'. Power supply voltage $V_{cc}$ is monitored by UVLO circuit 10 to ensure that power supply voltage $V_{cc}$ is maintained at a level that is safe or adequate for proper operation of a connected integrated circuit or associated device. For instance, prior to power supply voltage $V_{cc}$ reaching a minimum threshold level, output signal UVLO represents to the connected device that power supply voltage $V_{cc}$ is too low or unstable (i.e., 'bad'). Once this threshold is reached, output signal UVLO indicates to the integrated circuit that power supply voltage $V_{cc}$ is sufficiently high and stable to initiate the reset/initialization sequence and subsequent normal operation of the integrated circuit.

Current-mode UVLO circuit 10 minimizes the space consumed by typical UVLO circuits as well as the power consumed by typical UVLO circuits by utilizing a current-based approach to UVLO. In particular, UVLO circuits generally employ voltage band-gap devices to generate a steady reference voltage to which power supply $V_{cc}$ can be compared. In contrast, current-mode UVLO circuit 10 converts power supply $V_{cc}$ to a proportional current value and employs less expensive (i.e., smaller) voltage band-gap devices capable of generating a small reference voltage that is in turn used to generate a stable reference current. The reference current is compared with the proportional current value to determine whether the power supply voltage $V_{cc}$ is sufficient. In this way, current-mode UVLO circuit 10 provides under voltage lockout circuit functionality without the high cost (i.e., power and space requirements) associated with traditional UVLO circuits. In addition, current-mode UVLO circuit 10 provides improved noise immunity over traditional UVLO circuits.

In particular, in the embodiment shown in FIG. 1, UVLO circuit 10 includes voltage-to-current converter 12, comparator circuit 14, startup circuit 16, reference current generator 18 and voltage regulator 20. Power supply $V_{cc}$ is provided as an input to voltage-to-current converter 12. In response, voltage-to-current converter 12 generates a current that is proportional to the power supply voltage (described hereafter as proportional current $I_{cc}$). In one embodiment, proportional current $I_{cc}$ is linearly proportional to power supply voltage $V_{cc}$.

Proportional current $I_{cc}$ is provided from voltage-to-current converter 12 to comparator circuit 14, which compares proportional current $I_{cc}$ to reference current $I_{ref}$ generated by reference current generator 18. Based on this comparison, comparator circuit 14 controls the state of the UVLO signal to indicate whether power supply Vcc is 'good' or stable enough to be supplied to the rest of an integrated circuit or to a connected device.

Figure 3:
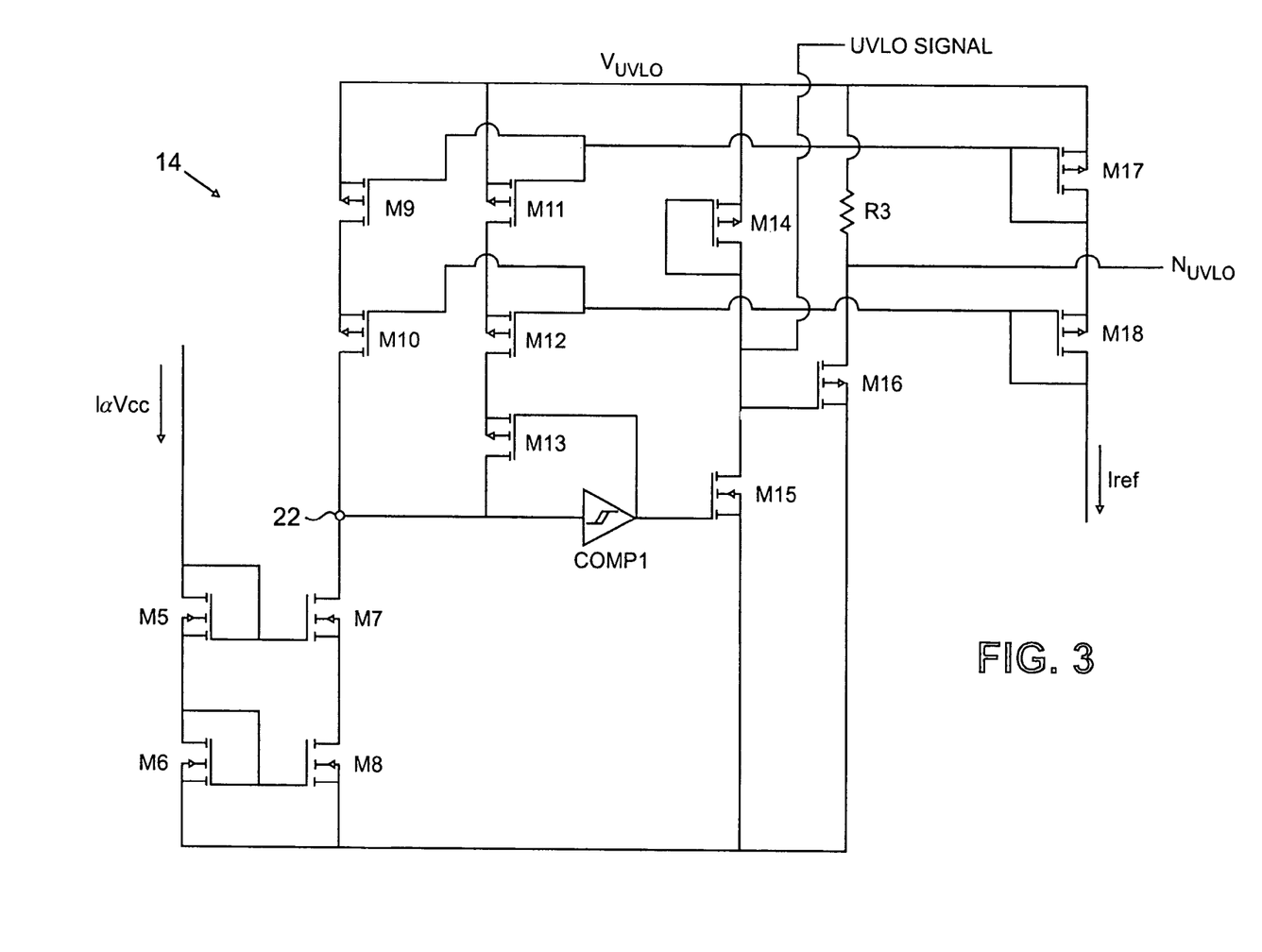
FIG. 3 is a circuit diagram that illustrates an embodiment of a comparator circuit employed in the under voltage lockout circuit shown in FIG. 1.

In addition, comparator circuit 14 builds in hysteresis to the comparison between proportional current $I_{cc}$ and reference current $I_{ref}$ such that small variations or "chatter" in proportional current $I_{cc}$ do not result in current-based UVLO circuit 10 oscillating between providing a 'supply good' signal and a 'supply bad' signal. In particular, the reference current to which proportional current $I_{cc}$ is compared (e.g., the current flowing through transistors M9 and M11 as shown in FIG. 3) is controlled within comparator circuit 14 to vary the trigger point associated with a change in a determination of the status of the power supply. In the alternative, comparator circuit 14 controls the proportional current $I_{cc}$ to vary the set point to generate the desired hysteresis while the reference current is kept constant.

Initially, when power supply $V_{cc}$ (and therefore proportional current $I_{cc}$) is low and corresponding UVLO signal indicates a 'supply bad' state, a first trigger point is used to determine when the magnitude of the proportional current $I_{cc}$ is sufficient to switch the UVLO signal from a 'supply bad' state to a 'supply good' state. Following the trigger of the UVLO signal to the 'supply good' state, a second trigger point is used to determine when the magnitude of the proportional current $I_{cc}$ is low enough to cause the UVLO signal to be triggered from the 'supply good' state to the 'supply bad' state. In particular, the second trigger point is less than the first trigger point. This ensures that as power supply Vcc (and correspondingly, proportional current $I_{cc}$) oscillates due to noise, the UVLO signal does not repeatedly switch between a 'supply good' state and a 'supply bad' state. By using different thresholds based on the state of the UVLO signal, hysteresis is built into comparator circuit 14.

Startup circuit 16 provides a masking signal (i.e., UVLO mask) to comparator circuit 14 to ensure that upon initial application of power (e.g., power supply voltage $V_{cc}$) to current-mode UVLO circuit 10 that the UVLO signal generated by comparator circuit 14 is maintained in a 'supply bad' state until power has propagated throughout the system. That is, at the onset of providing power to UVLO circuit 10, noise generated as power is supplied throughout different portions of the circuit may result in an inadvertent 'supply good' signal being generated by comparator circuit 14. To prevent this, startup circuit 16 generates a masking signal that is provided to comparator circuit 14 that maintains UVLO signal in a 'supply bad' state until sufficient power has been provided to startup circuit 16, at which time startup circuit 16 removes the masking signal, allowing the state of the UVLO signal to be determined by comparator circuit 14. The threshold point at which the UVLO mask is applied and removed is determined in part on the regulated voltages (Vreg1 and Vreg2) supplied by voltage regulator 20. In addition, startup circuit 16 generates a band-gap start signal that is provided to reference current generator 18, which acts to pull up the reference voltage $V_{BG}$, thereby realizing the desired $I_{ref}$ value such that it can be used by comparator circuit 14 to evaluate the proportional current $I_{cc}$.

Reference current generator 18 provides the reference current $I_{ref}$ to comparator circuit 14. The reference current $I_{ref}$ is based, in part, on the band-gap voltage $V_{BG}$ generated within reference current generator 18. Based on the voltage band-gap signal $V_{BG}$ a stable reference current $I_{ref}$ can be derived that is provided to comparator circuit 14. In this way, the reference current provided by reference current generator 18 is stable and relatively temperature invariant. A band-gap voltage generated by reference current generator 18 is provided to voltage regulator 20, which employs the stable and temperature invariant reference voltage to initiate the generation of regulated voltage $V_{UVLO}$ (which is derived from power supply voltage $V_{cc}$) as well as voltages proportional to the regulated voltage (labeled Vreg1, and Vreg2). Regulated voltage $V_{UVLO}$ is supplied to provide power throughout current-mode UVLO circuit 10.

Figure 2:
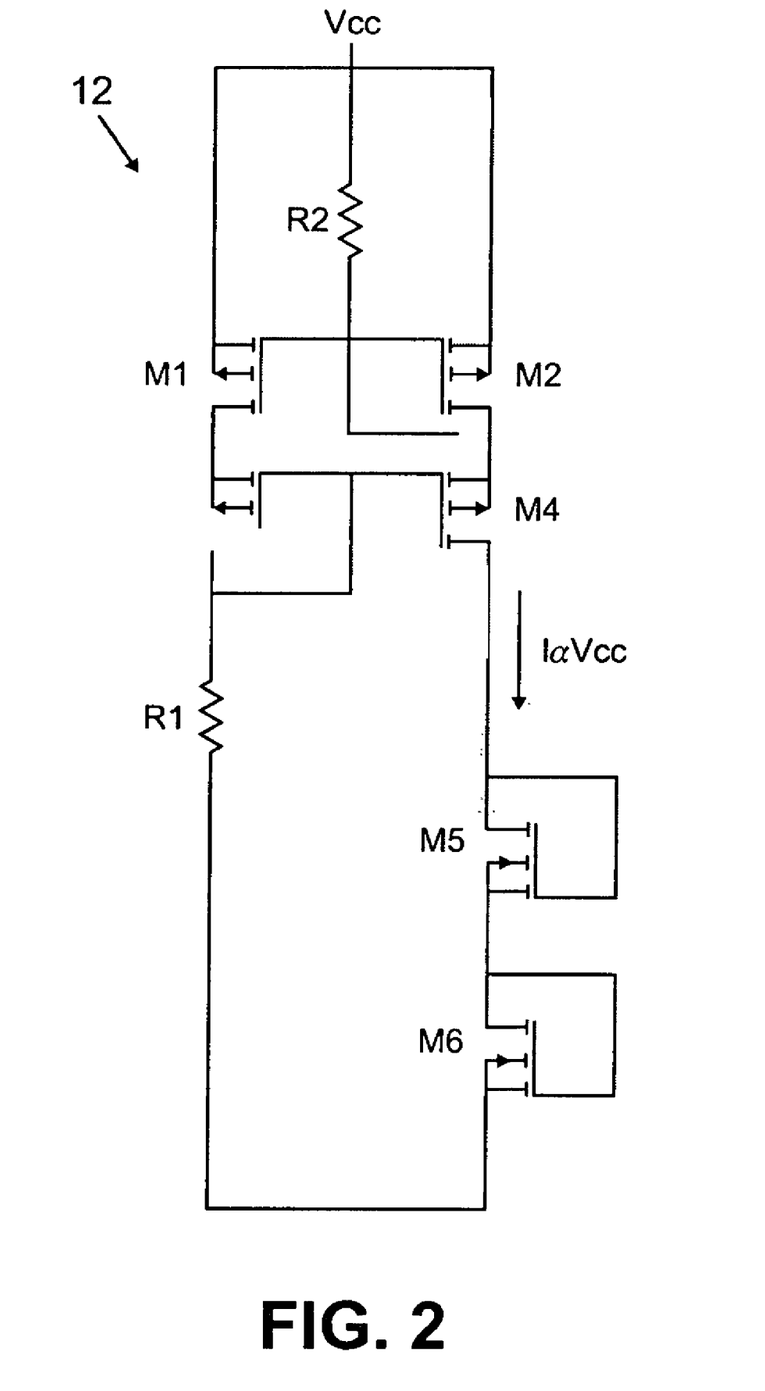
FIG. 2 is a circuit diagram that illustrates an embodiment of voltage-to-current converter employed in the under voltage lockout circuit shown in FIG. 1.

FIG. 2 illustrates one embodiment of voltage-to-current converter 12 that may be used in conjunction with current-based UVLO circuit 10. Voltage-to-current converter 12 includes resistors R1 and R2, and metal-oxide semiconductor field effect transistors (MOSFETs, referred to simply as "transistors") M1, M2, M3, M4, M5 and M6. In the circuit configuration shown in FIG. 2, the current generated through transistor M4 can be related to the ratio of resistances of resistors R1 and R2. In particular, if the resistance of resistor R1 is twice the value of the resistance of resistor R2, then the relationship of current through transistor M4 can be related to the power supply Vcc by the following equation:

$$I_{M4} = Vcc/R_1 \qquad \text{Equation 1}$$

As illustrated by Equation 1, the current through transistor M4 is directly proportional to the magnitude of power supply voltage $V_{cc}$. This current is referred to in FIG. 1 as current proportional to power supply $I_{cc}$. By properly selecting the magnitude of resistor R1, the magnitude of current proportional to power supply $I_{cc}$ can be maintained at a desirable level (i.e., a level that results in relatively/small voltages that in turn allow smaller devices to be employed). The current through transistor M4 is supplied to a current mirror that includes transistors M5 and M7 (as discussed below and shown in FIG. 3).

FIG. 3 illustrates one embodiment of comparator circuit 14 that may be used in conjunction with current-mode UVLO circuit 10. Comparator circuit 14 includes MOSFET transistors M7, M8, M9, M10, M11, M12, M13, M14, M15, M16, M17 and M18, resistor R3 and hysteretic voltage comparator Comp1.

Proportional current $I_{cc}$ generated through transistor M4 (as shown in FIG. 2) is mirrored in transistors M5 and M6. Likewise, reference current $I_{ref}$ (generated by reference current generator 18 as shown in FIG. 1 and discussed in more detail below with respect to FIG. 4) is supplied to transistor M17, and mirrored through transistors M9 and M11. The magnitude of the currents mirrored through transistors M9 and M11 depends, in part, on gate widths associated with transistors M9, M11 and M17. In particular, the magnitude of reference current mirrored through transistor M9 is dependent, in part, on the gate-width ratio between transistors M9 and M17. Thus, the current mirrored through transistor M9 can be controlled to a desired magnitude by properly designing the gate widths of transistors, M9 and M17. In this way, the reference current mirrored through transistor M9 (or M11) can be set to any desired magnitude.

Hysteretic voltage comparator Comp1 receives as input the voltage supplied at node 22, which reflects differences in magnitude between reference current $I_{ref}$ and proportional current $I_{cc}$. For instance, if proportional current $I_{cc}$ is low (indicating that power supply voltage $V_{cc}$ is low) then the current through transistor M8 will be smaller than the reference current mirrored through transistors M9 and M11 and sourced into node 22. The net result is that node 22 is maintained at a high voltage that results in hysteretic voltage comparator Comp1 maintaining the UVLO signal to represent to outside circuitry that power supply Vcc is 'bad' or insufficient. In addition, hysteretic voltage comparator Comp1 provides positive feedback to transistor M13. For instance, in the above example, with hysteretic voltage comparator Comp1 maintaining the UVLO signal in the 'supply bad' state, the positive feedback provided to transistor M13 results in transistor M13 conducting the reference current $I_{ref}$ mirrored through transistor M11 to node 22. This has the effect of increasing the threshold or set point to which the proportional current $I_{cc}$ is compared. As discussed below, feedback provided by hysteretic voltage comparator Comp1 to transistor M13 allows comparator circuit 14 to control the magnitude of the mirrored reference currents provided to node 22, and therefore creates the desired hysteresis effect. The specific amount of hysteresis introduced is dependent, in part, on the magnitude of the current mirrored through transistor M11, and thus ultimately supplied to node 22 when transistor M13 is conducting. As described with respect to the current mirrored through transistor M9, the magnitude of the current mirrored through transistor M11 is dependent on the gate width (i.e., dimensions) of transistor M11. By altering the gate width ratio between transistors M11 and M17, the magnitude of the hysteresis current can be controlled to any desired magnitude.

As power supply voltage $V_{cc}$ increases, proportional current $I_{cc}$ increases and correspondingly the current mirrored through transistor M8 increases. As the current through transistor M8 increases, the voltage at node 22 begins to decrease (i.e., the current through transistor M8 becomes greater than the current sourced into node 22 through transistors M9 and M11) and eventually trips hysteretic voltage comparator Comp1. In response, hysteretic voltage comparator Comp1 switches the state of the UVLO signal to indicate that power supply Vcc is 'good' or sufficient for supply to outside circuits or devices. In addition, hysteretic voltage comparator Comp1 provides feedback to transistor M13 that causes transistor M13 to turn 'off' (i.e., stop conducting). In this way, the reference current $I_{ref}$ mirrored through transistor M11 is prevented from flowing into node 22, thereby decreasing the magnitude of the current compared to proportional current $I_{cc}$. By reducing the magnitude of the reference current provided to node 22, the magnitude of the proportional current $I_{cc}$ to which the reference current is compared must drop to a level even lower than the level required to initially trip hysteretic voltage comparator Comp1. In this way, hysteresis is built into the comparison of proportional current $I_{cc}$ to the reference current $I_{ref}$.

The term hysteretic voltage comparator is used generally to describe devices that may be used to compare voltages as described by the present invention. In an exemplary embodiment, a Schmitt Trigger device may be employed as the hysteretic voltage comparator.

In addition, in the embodiment shown in FIG. 3, the reference current is controlled to provide the desired hysteresis. In other embodiments, the proportional current $I_{cc}$ is controlled to modify the set-point such that the desired hysteresis is provided.

Figure 4:
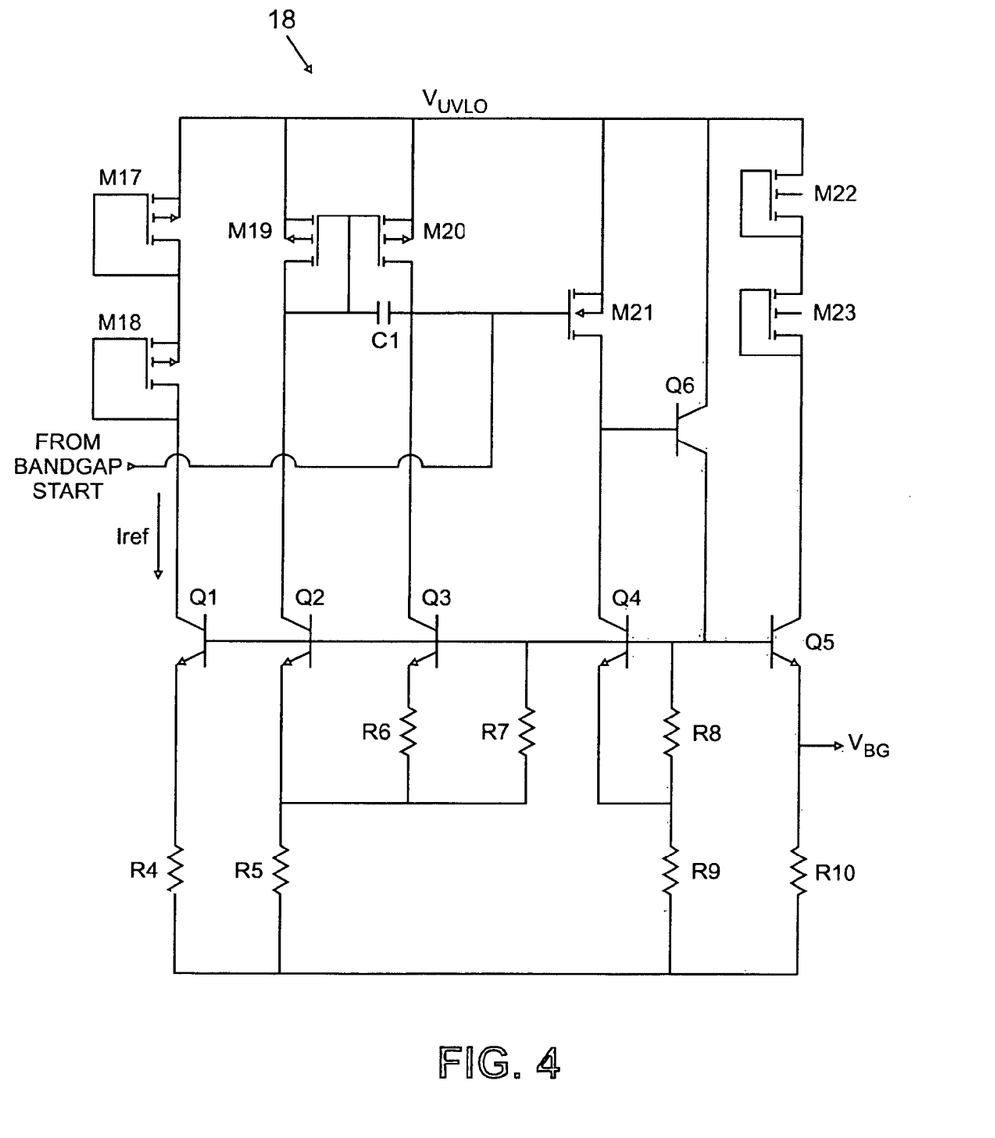
FIG. 4 is a circuit diagram that illustrates an embodiment of a current reference circuit employed in the under voltage lockout circuit shown in FIG. 1.

FIG. 4 illustrates one embodiment of reference current generator 18 that may be used in conjunction with current-mode UVLO circuit 10. In particular, reference current generator 18 is employed to generate reference current $I_{ref}$. In this embodiment, reference current generator 18 includes transistors M19, M20, M21, M22 and M23 (transistors M17 and M18 as described with respect to comparator circuit 14 are also shown to illustrate how the circuits may be connected to one another), bipolar junction transistors Q1, Q2, Q3, Q4, Q5 and Q6, resistors R4, R5, R6, R7, R8, R9 and R10, and capacitor C1.

Bipolar junction transistors Q1, Q2, Q3, Q4 and Q6 are employed together to generate a band-gap voltage $V_{BG}$. In traditional UVLO circuits, band-gap voltages would need to be generated at a magnitude representing the threshold values to which the power supply can be compared to determine whether the power supply is sufficient. In contrast, in the embodiment shown in FIG. 4, because the magnitude of power supply voltage $V_{cc}$ is represented by a proportional current, the magnitude of the band-gap voltage $V_{BG}$ created by bipolar junction transistors Q1, Q2, Q3, Q4 and Q6 need only generate a band-gap voltage capable of generating a desired reference current. In addition, the use of one or more current mirrors in hysteresis circuit 14 (for example, transistors M9 and M11) essentially multiplies the magnitude of the reference current $I_{ref}$ and allows for the generation of a wide range of supply voltage threshold levels at reduced current consumption levels than may otherwise be possible in a traditional UVLO circuits.

In this embodiment, the magnitude of reference current $I_{ref}$ is determined based on the differences between bipolar junction transistors Q1, Q2, Q3, Q4 and Q6 as well as the magnitude of resistor R4. The reference current $I_{ref}$ generated by these components is provided to transistors M17 and M18, and mirrored (as discussed above with respect to FIG. 3) through transistors M9 and M11. In addition, a band-gap voltage (labeled $V_{BG}$) generated by transistors Q1, Q2, Q3, Q4 and Q5 is provided as an input to voltage regulator circuit 20.

Figure 5:
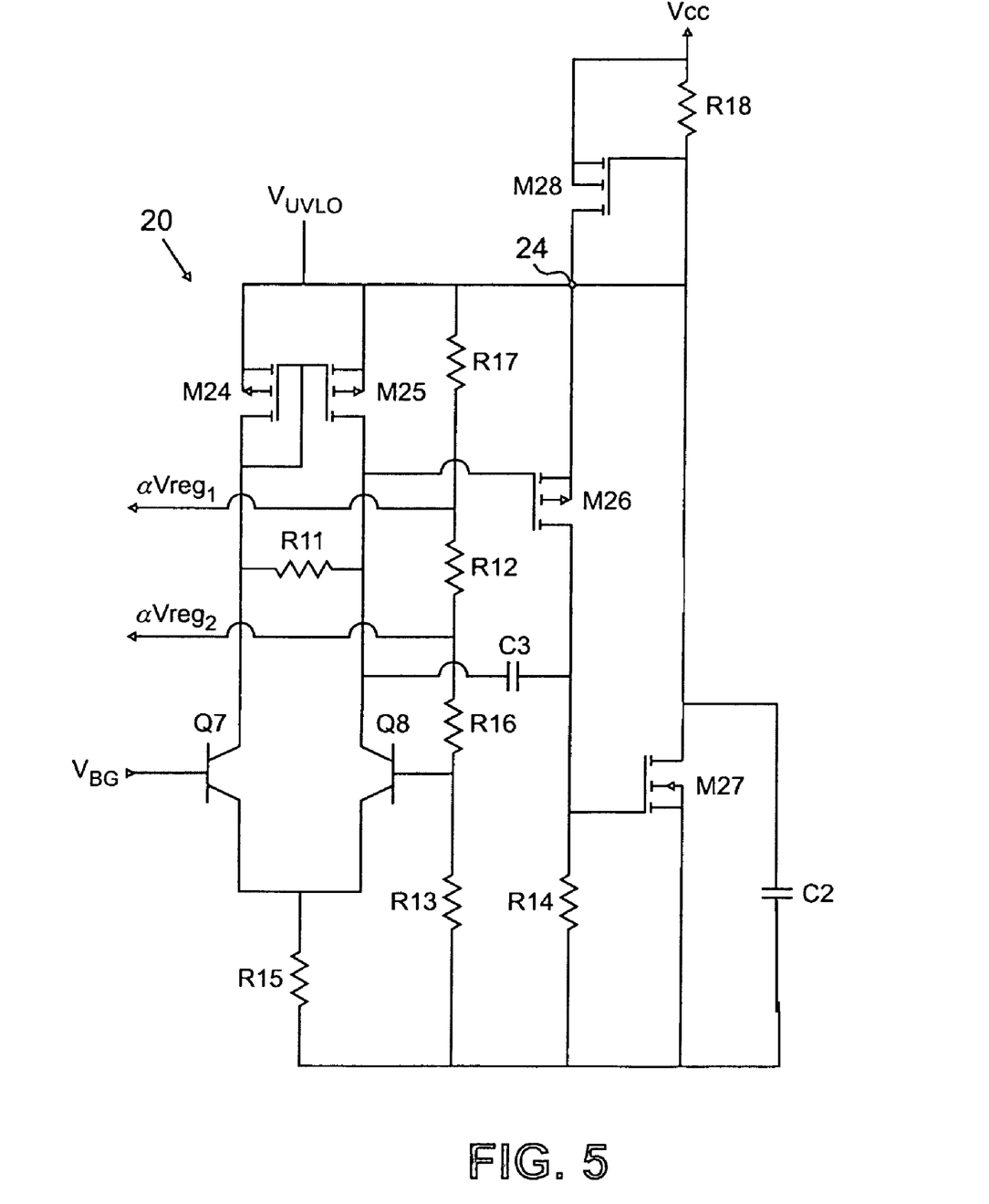
FIG. 5 is a circuit diagram that illustrates an embodiment of a voltage regulator circuit employed in the under voltage lockout circuit shown in FIG. 1.

FIG. 5 illustrates one embodiment of voltage regulation circuit 20 that may be used in conjunction with current-mode UVLO circuit 10. In this embodiment, voltage regulation circuit 20 includes transistors M24, M25, M26, M27 and M28, bipolar junction transistors Q7 and Q8, and resistors R11, R12, R13, R14, R15, R16, R17 and R18. Voltage regulation circuit 20 receives as input supply voltage Vcc and band-gap voltage $V_{BG}$ generated by current reference generator 18 (as described above with respect to FIG. 4). In particular, band-gap voltage $V_{BG}$ is provided to bipolar junction transistors Q7 and Q8 which form a differential amplifier. The resulting voltage generated at the collector of bipolar junction transistor Q8 controls the gate voltage of transistor M26. In this way, the power supply voltage Vcc supplied to transistor M26 and resistor R14 is regulated to a desired magnitude at node 24 (i.e., labeled throughout as $V_{UVLO}$). The regulated voltage $V_{UVLO}$ is used to supply voltage throughout current-mode UVLO circuit 10 (as shown in FIG. 1). Voltages proportional to the regulated voltage $V_{UVLO}$ (labeled as $\alpha V_{reg1}$ and $\alpha V_{reg2}$) are also generated by voltage regulation circuit 20. A voltage divider circuit that includes resistors R17, R12, R16 and R13 regulates the proportional voltages $V_{reg1}$ and $V_{reg2}$ to desired levels.

Figure 6:
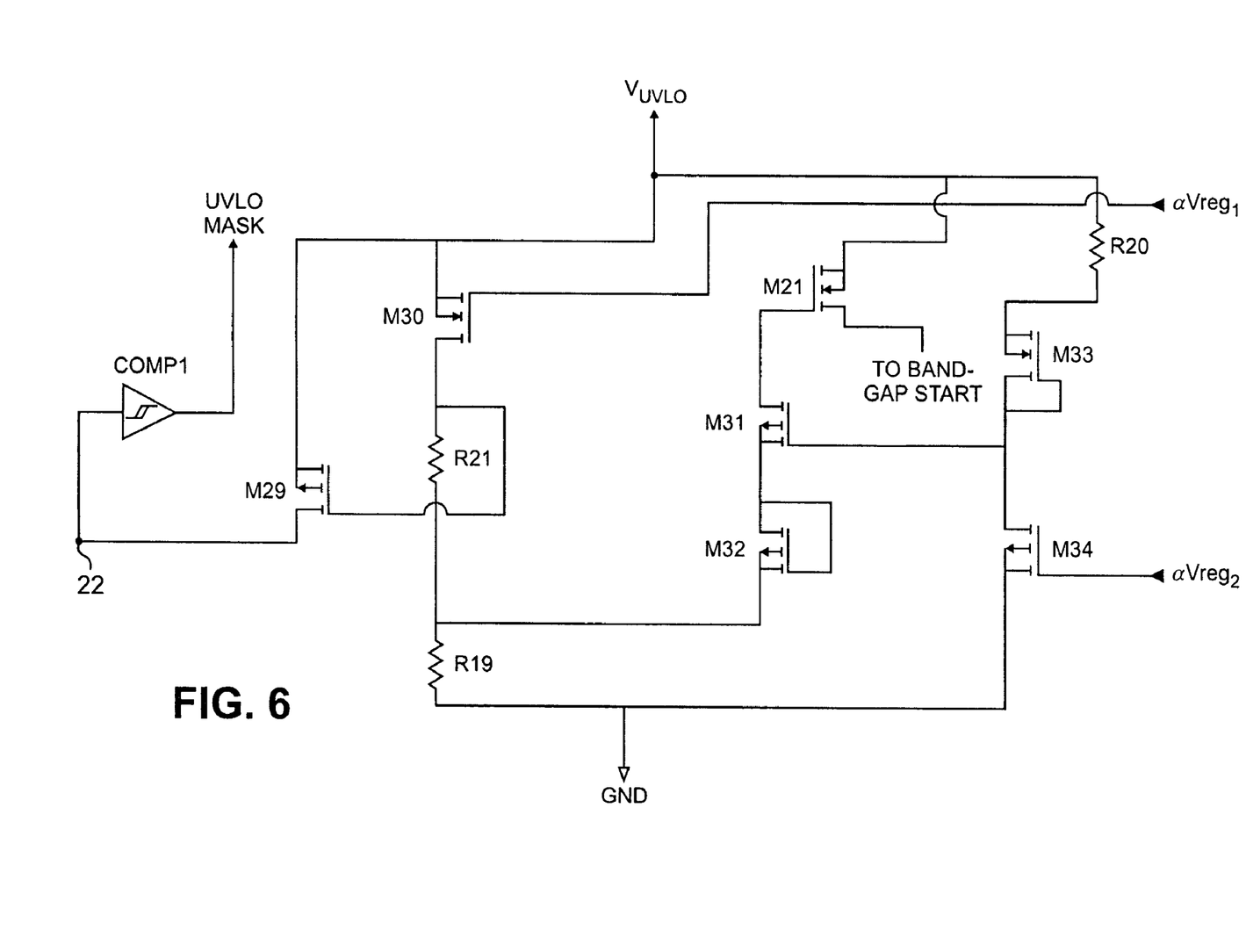
FIG. 6 is a circuit diagram that illustrates an embodiment of a start-up circuit employed in the under voltage lockout circuit shown in FIG. 1.

FIG. 6 illustrates one embodiment of startup circuit 16 which may be used in conjunction with current-mode UVLO circuit 10. In this embodiment, startup circuit 16 includes transistors M29, M30, M31, M32, M33 and M34 and resistors R19, R20 and R21. Startup circuit 16 acts to prevent false 'supply good' signals from being generated at the onset of power being provided to UVLO circuit 10 and also acts to provide a startup current to reference current generator 18.

At the onset of providing power to current-mode UVLO circuit 10, startup circuit 16 acts to maintain the input of hysteretic voltage comparator Comp1 (i.e., node 22 as shown in FIG. 3) at a relatively high voltage such that the UVLO signal generated by hysteretic voltage comparator Comp1 properly indicates the power supply Vcc is not yet adequate for initialization of other outside circuits or devices. In particular, transistor M29 is initially maintained in an 'on' or conducting state that results in node 22 being pulled to a high voltage as dictated by regulated voltage $V_{UVLO}$. As the voltage supplied throughout current-mode UVLO circuit 10 increases, the voltage supplied to the gate of transistor M29 is reduced until transistor M29 is 'off' or non-conducting. At this point, the voltage at the input of hysteretic voltage comparator Comp1 is determined based on the comparison between the reference current $I_{ref}$ and the proportional current $I_{cc}$ and startup circuit 16 does not provide any further influence to hysteretic voltage comparator Comp1. In this way, a 'masking signal' as shown in FIG. 1 is provided to comparator circuit 14 to prevent erroneous indications that the power supply is 'good'.

In addition, startup circuit 16 also provides an initial startup current to reference current generator 18. As shown in FIG. 6, startup circuit 16 employs transistor M21, connected to regulated voltage $V_{UVLO}$ to generate an initial boost of current (labeled 'band-gap start') that acts to pull up band-gap voltage $V_{BG}$ and therefore initiate reference current $I_{ref}$. In this way, startup circuit 16 acts to jumpstart the operation of reference current generator 18.

Therefore, current-mode UVLO circuit 10 provides a system for providing under voltage lockout with traditional functionality (such as built-in hysteresis generation) at a low cost. In particular, current-mode UVLO circuit 10 ensures the voltage provided by a power supply is sufficient for application to connected circuits, but provides a current-based method of monitoring the current such that the cost in area and power associated with current-based UVLO circuit are minimized.

Although, the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and "circuit" and the like should be construed in their broadest contexts to include portions of ICs that are conveniently described as functional components, as well as discrete devices.

The invention claimed is:

1. An under voltage lockout (UVLO) circuit comprising:
    a voltage-to-current converter that generates a proportional current in response to a power supply voltage input to the voltage-to-current converter;
    a reference current generator that generates a reference current; and
    a comparator that compares the proportional current to the reference current and in response generates an output signal having a state selected from a first state that indicates that the power supply voltage is insufficient and a second state that indicates that the power supply voltage is sufficient, wherein the comparator includes a hysteretic voltage comparator having an input node connected to compare the reference current to the proportional current and to set the state of the output signal based on the comparison, wherein the comparator includes a first current mirror connected to mirror the reference current and to provide a first mirrored reference current to the input node of the hysteretic voltage comparator and a second current mirror connected to mirror the reference current and to provide a second mirrored reference current to the input node of the hysteretic voltage comparator, wherein the hysteretic voltage comparator provides positive feedback to the second current mirror that selectively prevents the second current mirror from providing the second mirrored reference current to the node connected to the input of the hysteretic voltage comparator based on the state of the output signal such that hysteresis is generated in the comparator.

2. The UVLO circuit of claim 1, wherein the comparator controls the magnitude of the reference current being compared to the proportional current based on the state of the output signal to provide hysteresis to the UVLO circuit.

3. The UVLO circuit of claim 1, wherein the comparator controls the magnitude of the proportional current being compared to the reference current based on the state of the output signal to provide hysteresis to the UVLO circuit.

4. The UVLO circuit of claim 1, wherein the hysteretic voltage comparator is a Schmitt trigger device.

5. The UVLO circuit of claim 1, wherein the magnitude of the first mirrored reference current is dependent, in part, on a ratio of gate widths between a first transistor and a second transistor included in the first current mirror.

6. The UVLO circuit of claim 1, wherein the magnitude of the second mirrored reference current is dependent, in part, on a ratio of gate widths between a first transistor and a second transistor included in the second current mirror.

7. The UVLO circuit of claim 1, further including:
    a startup circuit that generates a masking signal in response to the power supply initially providing power to the UVLO circuit, wherein the masking signal is provided to the comparator circuit to initially maintain the output signal at a state that indicates the power supply is insufficient.

8. The UVLO circuit of claim 7, wherein the startup circuit further includes:
    a transistor connected to a regulated voltage and the input node of the hysteretic voltage comparator, wherein the transistor is maintained in a conducting state in response to the power supply initially providing power to the UVLO circuit such that the regulated voltage is provided to the input node of the hysteretic voltage comparator to maintain the output signal in the first state.

9. The UVLO circuit of claim 1, wherein the reference current generator includes:
    a band-gap voltage generator that generates a stable band-gap voltage at a desired magnitude; and
    a resistor network having a selected resistance and connected to the band-gap voltage such that the magnitude of the band-gap voltage and the selected resistance of the resistor network results in the reference current being generated at a desired magnitude.

10. The UVLO circuit of claim 9, further including:
    a voltage regulator for generating a regulated voltage that is supplied to components within the UVLO circuit based on the power supply voltage.

11. The UVLO circuit of claim 1, wherein the proportional current generated by the voltage-to-current converter is linearly proportional to the power supply voltage.

12. A method of providing under voltage protection to a circuit, the method comprising:
    converting a power supply voltage to a proportional current;
    generating a reference current;
    comparing the proportional current to the reference current, which includes:
        applying the reference current to a first current mirror and a second current mirror to generate a first mirrored reference current and a second mirrored reference current;
        supplying the first mirrored reference current and the second mirrored reference current to a node connected to an input node of a hysteretic voltage comparator;

supplying the current proportional to the power supply voltage to the input node of the hysteretic voltage comparator; and controlling the state of the output signal to be in the first state if the first and second mirrored reference currents are of greater magnitude than the current proportional to the power supply and controlling the output signal to be in the second state if the first and second mirrored reference currents are of lesser magnitude than the current proportional to the power supply;

generating an output signal having a state selected from a first state that indicates that the powers supply voltage is insufficient and a second state that indicates that the powers supply voltage is sufficient; and modifying the magnitude of the reference current based on the state of the output signal to selectively vary a threshold at which the output signal is changed from one state to another.

13. The method of claim 12, wherein generating a reference current value includes:

generating a reference voltage with a voltage band-gap generator; and applying the reference voltage to a resistor network that generates the reference current at a desired magnitude.

14. The method of claim 12, wherein modifying the magnitude of the reference current based on the state of the output signal to selectively vary a threshold at which the output signal is changed from one state to another includes:

selectively controlling the supply of the second mirrored reference current to the input of the hysteretic voltage comparator based on the state of the output signal to selectively decrease or increase the magnitude of the reference current provided to the input node of the hysteretic voltage comparator to which the proportional current is compared.

15. The method of claim 12, further including:

generating a mask signal that initially maintains the output signal in the first state for a period of time following the initiation of power.

16. An under voltage lockout (UVLO) circuit comprising:

a voltage-to-current converter that generates a proportional current in response to a power supply voltage input to the voltage-to-current converter;

a reference current generator that generates a reference current; and a comparator that compares the proportional current to the reference current and in response generates an output signal having a state selected from a first state that indicates that the power supply voltage is insufficient and a second state that indicates that the power supply voltage is sufficient, wherein the comparator controls the magnitude of the proportional current being compared to the reference current based on the state of the output signal to provide hysteresis to the UVLO circuit.

* * * * *